(12) United States Patent
Paul et al.

(10) Patent No.: US 11,498,272 B2
(45) Date of Patent: Nov. 15, 2022

(54) 3-D PRINTER EXTRUSION HEAD

(71) Applicants: Michael Patrick Paul, Harborcreek, PA (US); Michael Gilbilterra, Erie, PA (US); Ryan Hutchinson, Enon Valley, PA (US)

(72) Inventors: Michael Patrick Paul, Harborcreek, PA (US); Michael Gilbilterra, Erie, PA (US); Ryan Hutchinson, Enon Valley, PA (US)

( * ) Notice: Subject to any disclaimer, the term of this patent is extended or adjusted under 35 U.S.C. 154(b) by 372 days.

(21) Appl. No.: 16/819,885

(22) Filed: Mar. 16, 2020

(65) Prior Publication Data

US 2020/0290272 A1 Sep. 17, 2020

Related U.S. Application Data

(60) Provisional application No. 62/819,253, filed on Mar. 15, 2019.

(51) Int. Cl.
*B29C 64/209* (2017.01)
*B33Y 30/00* (2015.01)

(52) U.S. Cl.
CPC ............ *B29C 64/209* (2017.08); *B33Y 30/00* (2014.12)

(58) Field of Classification Search
CPC .............................. B29C 64/209; B33Y 30/00
See application file for complete search history.

(56) References Cited

U.S. PATENT DOCUMENTS 10,254,499 B1 * 4/2019 Cohen ...................... G02B 6/25
2017/0151704 A1 * 6/2017 Go ........................ B29C 48/266

* cited by examiner

*Primary Examiner* — Nathan T Leong
(74) *Attorney, Agent, or Firm* — Penn State Law IP Clinic

(57) ABSTRACT

A device that can be attached to most 3D printers to allow various materials and filaments to be used in a controlled manner. This device allows enhanced control while using flexible materials and filaments by using a belt, a compression wheel comprising a groove for said filament and comprising teeth for traction of said filament. The movement of the belt is controlled by a stepper motor connected to a knurl gear which drives the system.

14 Claims, 13 Drawing Sheets

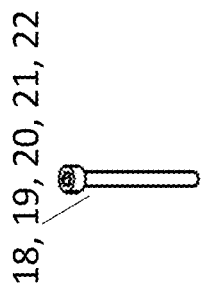
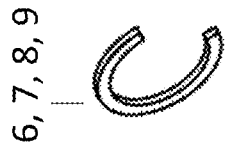
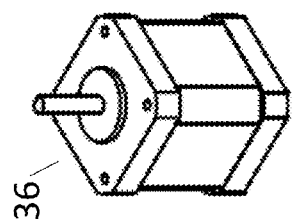
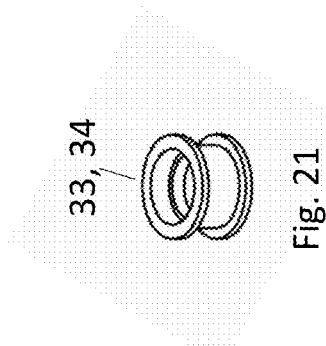

3-D PRINTER EXTRUSION HEAD

CROSS-REFERENCE

This application claims the benefit of U.S. Provisional Application No. 62/819,253, filed Mar. 15, 2019, which application is incorporated herein by reference.

BACKGROUND OF THE INVENTION

Current 3-D printer extruders use two gears meshing to control the extrusion of plastic. The systems currently available work well for rigid filaments such as polylactic acid (PLA), but for lower durometer thermoplastic polyurethane (TPU), those systems do not adequately control the plastic extrusion due to the elasticity and flexibility properties of the filament. In the 3D printer extrusion systems that are already in the prior art and try to control flexible filaments, there are issues with inaccurate control. For instance, in these systems, filament can buckle between the gear meshing mechanisms and the output filament guide or hot-end. There also becomes the issue of slow print times, because these systems are not able to print flexible materials quickly without having issues with shaking and blobs forming on the printing bed, instead of the intended figure.

SUMMARY OF THE INVENTION

In some embodiments, a 3D printer extrusion head comprising: a backplate; a stepper motor assembly, wherein said stepper motor assembly further comprises a knurl gear; a compression wheel assembly, comprising a compression wheel further comprising a groove for a filament and teeth for traction of the filament and pulley belt; a system of pulleys, wherein a pulley belt wraps around said compression wheel, said system of pulleys, and said knurl gear; and an input filament guide and an output filament guide to guide said filament through the 3D printer extrusion head. In some aspects, the 3D printer extrusion head further comprises an attachment spacer. In some aspects, wherein each of said system pulleys is further comprised of two or more pulleys, and each of said two or more pulleys is comprised of two pulley spacers and two bearings, and wherein a screw and a nut are used to attach said pulley assembly to said backplate. In some aspects, wherein said backplate is comprised of one or more screw holes and one or more bearing holes to affix said backplate to a 3D printer. In some aspects, wherein said stepper motor assembly is comprised of one or more stepper motors. In some aspects, wherein said input filament guide and said output filament guide further comprises the ability to control a filament.

In some aspects, wherein said input filament guide and said output filament guide further comprises the ability to control a filament. In other aspects, wherein said filament comprises a flexible filament. In other aspects, wherein said filament comprises a medium-flexible filament. in some aspects, wherein said filament comprises a non-flexible filament.

In some aspects, wherein said backplate, said compression wheel, said pulley spacer, and attachment spacer, and said input filament guide are 3D printed. In other aspects, wherein said compression wheel assembly further comprises two bearings, a screw and a nut to attach said compression wheel assembly to said backplate.

In some aspects, wherein said stepper motor assembly is attached to said backplate using four screws. In other aspects, wherein one of said system of pulleys is fixed to a tensioning platform which may move closer or further from the center of said backplate to create less or more tension on said pulley belt. In some aspects, wherein the tensioning platform is further comprised of a spring, a moveable trolley, a spring cap, a screw, wherein said spring cap is placed at the top end of said spring to allow said spring to move said moveable trolley which will then move said tensioning platform.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 18 is an illustration of a stepper motor from a lateral view, rotated downwards approximately 20°.

FIG. 19 is an illustration of pulley spacer from a side view, rotated laterally 45°.

FIG. 20 is an illustration of a stepper motor screw from a side view.

FIG. 21 is an illustration of a pulley from a lateral view, rotated downwards approximately 20°.

FIG. 22 is an illustration of the tensioner assembly screw from a side view.

DETAILED DESCRIPTION OF THE INVENTION

Figure 1:
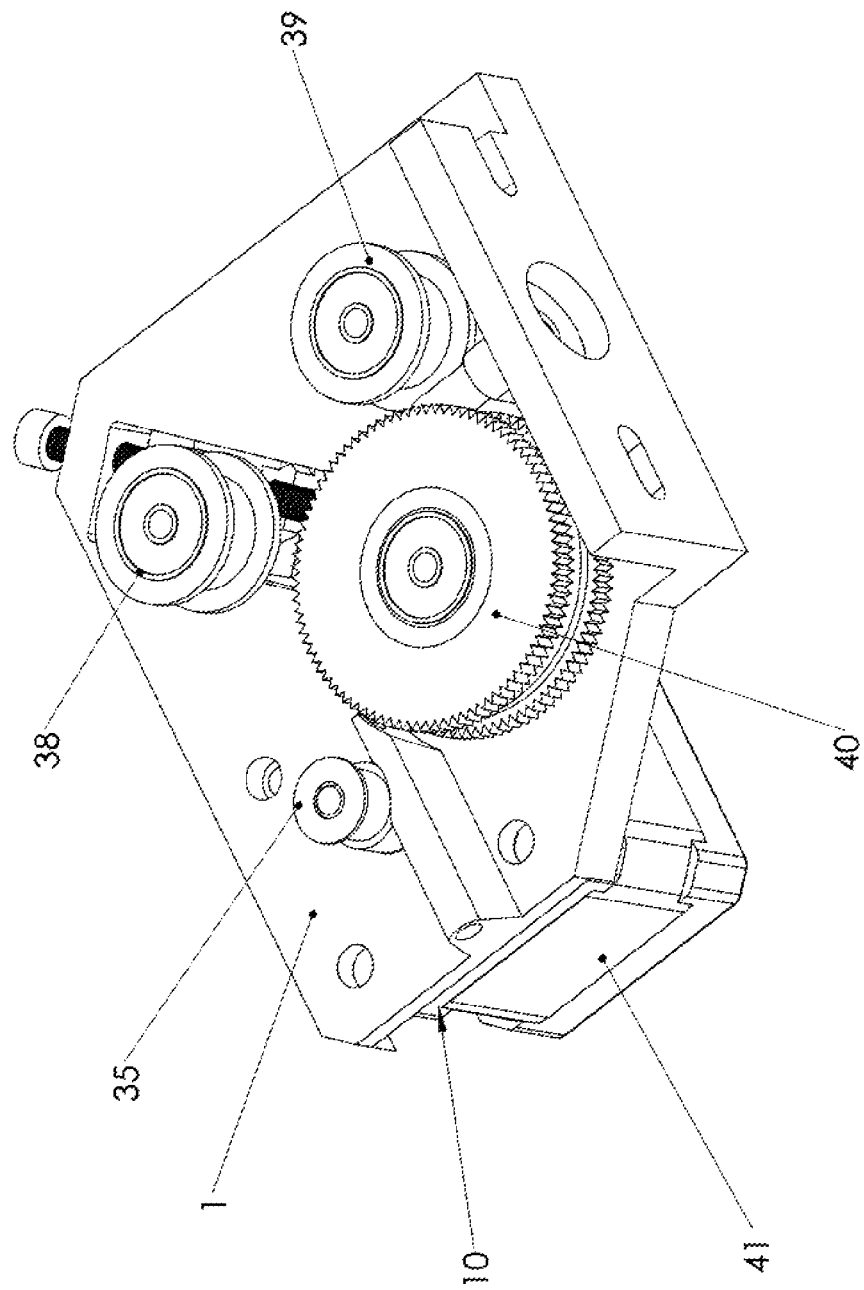
FIG. 1 is an illustration of an exemplary embodiment of a 3D printer extrusion head from a lateral view being rotated upwards approximately 45°, depicting: a backplate, a compression wheel assembly, a knurl gear, a stepper motor assembly, an attachment spacer, and two separate pulley assemblies.

FIG. 1 depicts an embodiment of a 3D printer extrusion head and the components thereof from a lateral view.

In FIG. 1, the 3D printer extrusion head is comprised of: a backplate (1), a stepper motor assembly (41), a compression wheel assembly (40), an attachment spacer (10), a knurl gear (35), a first pulley assembly (38), and a second pulley assembly (39).

Figure 4:
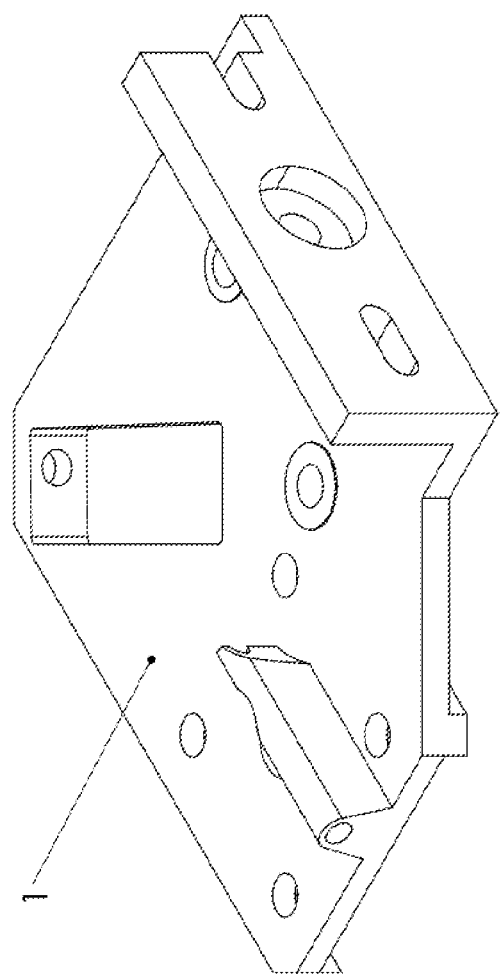
FIG. 4 is an illustration of an exemplary embodiment of a 3D printer extrusion head backplate from a lateral view, rotated downwards approximately 45°.

FIG. 4 depicts an exemplary embodiment of a backplate (1). In another embodiment, the size of the backplate (1) may be changed to account for varying quantities and sizes of the pulleys. Additionally, in other embodiments, the mounting locations on the backplate (1) may also be changed to account for different mounting methods for different 3D printers. The backplate (1) allows the 3D printer extrusion head to be attached to almost any Fused Deposition Modeling (FDM) 3D printer through mounting holes.

Figure 7:
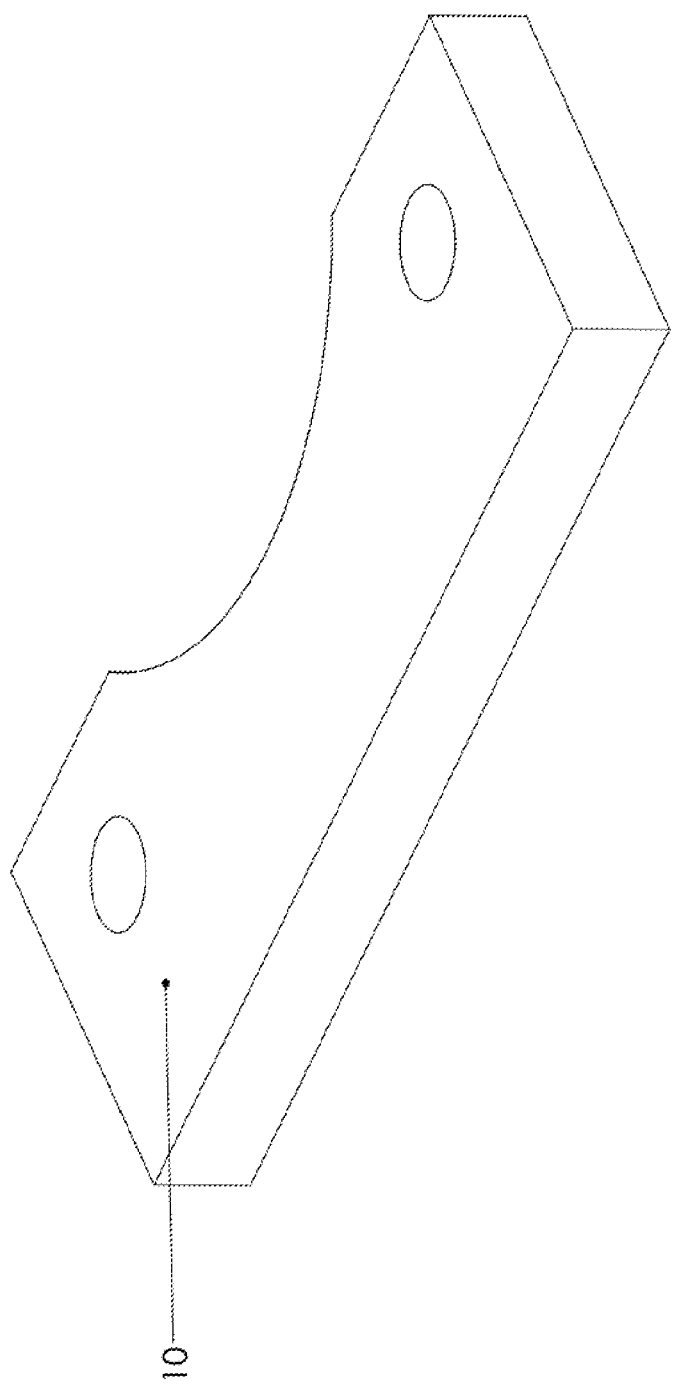
FIG. 7 is an illustration of an exemplary embodiment of an attachment spacer from a lateral view, rotated upwards approximately 45°.

FIG. 7 depicts an embodiment of an attachment spacer (10). In some embodiments, the attachment spacer (10) may be a placeholder to allow for a user to add attachments such as a filament measurement sensor that will allow for adjustment of print settings based on the diameter of the filament that is going into the machine.

Figure 16:
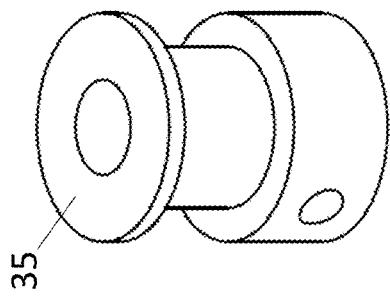
FIG. 16 is an illustration of a knurl gear from a lateral view, rotated downwards approximately 20°.

FIG. 16 depicts an embodiment of a knurl gear (35), wherein the depth of the entire knurl gear may be 0.55 mm and the depth of the inner cylinder of the knurl gear (35) may be 0.28 mm. The knurl gear (35) may also have an inner radius of 0.2 mm and an outer radius of 0.47 mm at its top.

The stepper motor assembly (41) of FIG. 1 is further comprised of FIG. 18's stepper motor (36) which is attached to the backplate (1) and the knurl gear (35)—of FIG. 16—using a stepper motor screw (18). The stepper motor assembly (41) additionally has an attachment spacer (10)—of FIG. 7—inserted between the stepper motor assembly (41) and the backplate (1) before four stepper motor screws (19, 20, 21, and 22) are inserted into the stepper motor assembly (41) to secure it to the backplate (1). In another embodiment, more stepper motors (36) may be added to create more accurate and finer control over the pulley belt (37). In exemplary embodiments, the backplate (1), the compression wheel (2), the attachment spacer (10), the adjustment block (5), and the input filament guide (11) are 3D printed. In other embodiments, the backplate (1), the compression wheel (2), the attachment spacer (10), the adjustment block (5), and the input filament guide (11) may be injection molded from plastic—to reduce costs—or made out of metal to improve longevity.

FIG. 18 depicts an embodiment of a stepper motor (36) and the components thereof, where in an exemplary embodiment, the stepper motor (36) may have measurements such as having a depth of 1.89 mm, a length and width on the face of the stepper motor of 1.22 mm, and a length of the rotating column of 0.87 mm. The rotating column may further have a radius of 0.10 mm.

FIG. 19 depicts an exemplary embodiment of a pulley spacer (6, 7, 8, and 9). The pulley spacer (6, 7, 8, and 9) may have a depth of 0.05 mm, an inner radius of 0.35 mm, an outer radius of 0.43 mm, and a missing curve length of 0.49 mm.

FIG. 21 depicts an exemplary embodiment of a pulley (33 and 34). The pulley (33 and 34) may have a total height of 0.5 mm, a height between the bottom lip and the top lip of the pulley of 0.37 mm, an inner diameter of 0.63 mm and an outer diameter of 0.87 mm.

Figure 14:
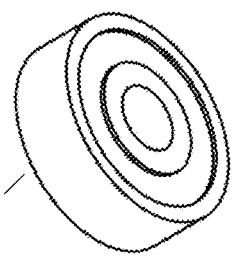
FIG. 14 is an illustration of a bearing from a lateral view, rotated upwards approximately 45°.

The first pulley assembly (38)—of FIG. 1—is comprised of two pulley spacers (6 and 7)—of FIG. 19—which are attached to the pulley (33)—of FIG. 21—and two bearings (14 and 15)—of FIG. 14—are inserted into pulley (33) to create the first pulley assembly (38).

The second pulley assembly (39)—of FIG. 1—is comprised of two pulley spacers (8 and 9)—of FIG. 19—which are attached to the pulley (34)—of FIG. 21—and two bearings (16 and 17)—of FIG. 14—are inserted into pulley (34) to create the second pulley assembly (39).

In another embodiment, the spacing between the first pulley assembly (38) and the second pulley assembly (39) could be more efficient, to allow for a shorter pulley belt (37) to be used.

In an exemplary embodiment, the first pulley assembly (38) is placed on a moveable platform, located above the tensioner assembly (42), wherein, the platform allows for the tensioning of the pulley belt (37) as to adjust how much grip the system has on the filament. In an exemplary embodiment, the first pulley assembly (38) is placed on a moveable tensioning platform, located above the tensioner assembly (42), wherein, the platform allows for the tensioning of the pulley belt (37) as to adjust how much grip the system has on the filament. In this embodiment, the tensioner assembly's (42) platform—or moveable trolley—allows a user to increase the tension on the belt by moving it further from the center of the backplate (1) as the 3D printer extrusion head is used and the pulley belt (37) is worn down and stretches.

In an exemplary embodiment, the second pulley assembly (39) is fixed and allows for clearance of the pulley belt (37) so that it does not intersect itself and get knotted up or worn down due to coming into contact with itself and creating friction.

FIG. 20 depicts an embodiment of a stepper motor screw, for which there are five used in the 3D printer extrusion head assembly (18, 19, 20, 21, and 22). These stepper motor screws, in an exemplary embodiment, may have a depth—from the bottom to the screw head—of 1.17 mm and a depth of the screw head of 0.12 mm.

Figure 5:
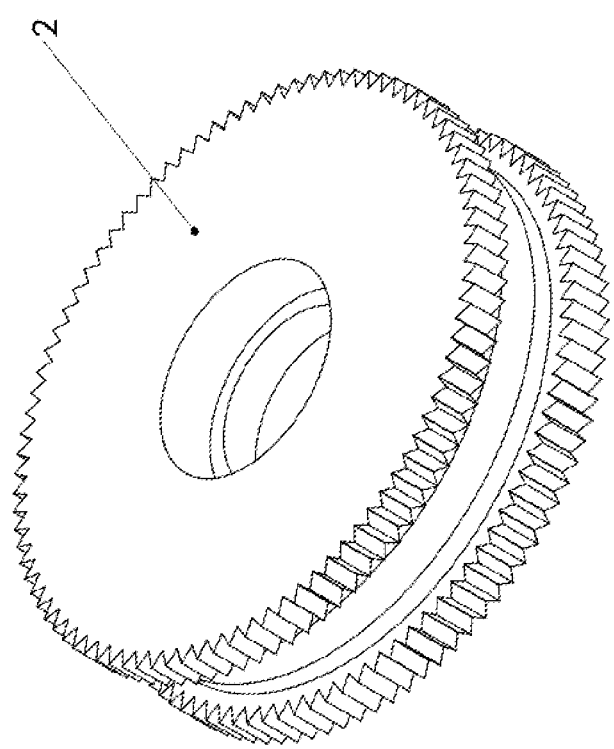
FIG. 5 is an illustration of an exemplary embodiment of a compression wheel from a lateral view, rotated upwards approximately 45°.

The compression wheel assembly (40) of FIG. 1 is further comprised of two bearings (12 and 13)—of FIG. 14—which are inserted into the compression wheel (2)—of FIG. 5—to make the compression wheel assembly (40). The compression wheel assembly (40) is then attached to the backplate (1) using a screw (23)—of FIG. 17—and a nut (27)—of FIG. 13.

FIG. 5 depicts a compression wheel (2), wherein the compression wheel (2) may be changed to allow thicker filaments into the 3D printer extrusion head, like a 1.75 mm or 5 mm filament by placing a smaller-diameter compression wheel (2) into the 3D printer extrusion head assembly. The compression wheel (2) may be placed adjacent to the input filament guide (11) of the 3D printer extrusion head, and wherein the compression wheel (2) has a small channel around the circumference of the compression wheel (2) which allows for the filament (not pictured) to move through the 3D printer extrusion head. This small channel, or groove, allows more flexible material to wrap around the compression wheel to prevent movement and shaking of the filament while also allowing clearance for the filament without compressing and damaging more flexible filaments. This groove also allows less-flexible filament to be driven through the 3D printer extrusion head.

Additionally, the compression wheel (2) may also have small teeth in the filament channel which will allow for traction on the filament. The compression wheel's (2) channel, in some embodiments, may also contain knurl edges to allow for grip if a user would like to advance the compression wheel (2) by hand. The pulley belt (37) may also sit within the channel—or groove—of the compression wheel (2).

Figure 13:
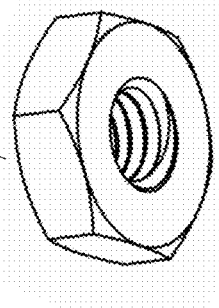
FIG. 13 is an illustration of a nut from a bottom view, rotated upwards approximately 45°.

FIG. 13 depicts an embodiment of a nut, for which there are five used in the 3D printer extrusion head assembly (27, 28, 29, 30, and 31). These nuts (27, 28, 29, 30, and 31) may have a length of 0.43 mm, a depth of 0.13 mm, and an inner opening, or hole, radius of 0.1 mm.

FIG. 14 depicts an embodiment of a bearing, for which there are six used in the 3D printer extrusion head assembly (12, 13, 14, 15, 16, and 17). These bearings (12, 13, 14, 15, 16, and 17) may have an outer ring diameter of 0.63 mm and an inner ring diameter of 0.2 mm. Further, the bearings (12, 13, 14, 15, 16, and 17) may have a depth of 0.2 mm.

Figure 17:
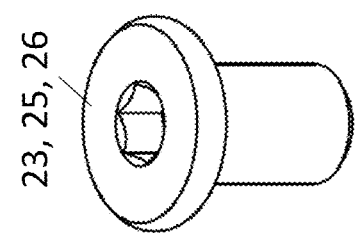
FIG. 17 is an illustration of a screw from a lateral view, rotated downwards approximately 20°.

FIG. 17 depicts a screw, for which there are three used in the 3D printer extrusion head assembly (23, 25, and 26). These screws (23, 25, and 26) may have a length, from the bottom of the screw to the head of the screw, of 0.31 mm and a depth of the screw head of 0.06 mm. These screws (23, 25, and 26) may also have an outer diameter of 0.35 mm and a diameter of the base of the screw, at the bottom, of 0.2 mm.

Figure 2:
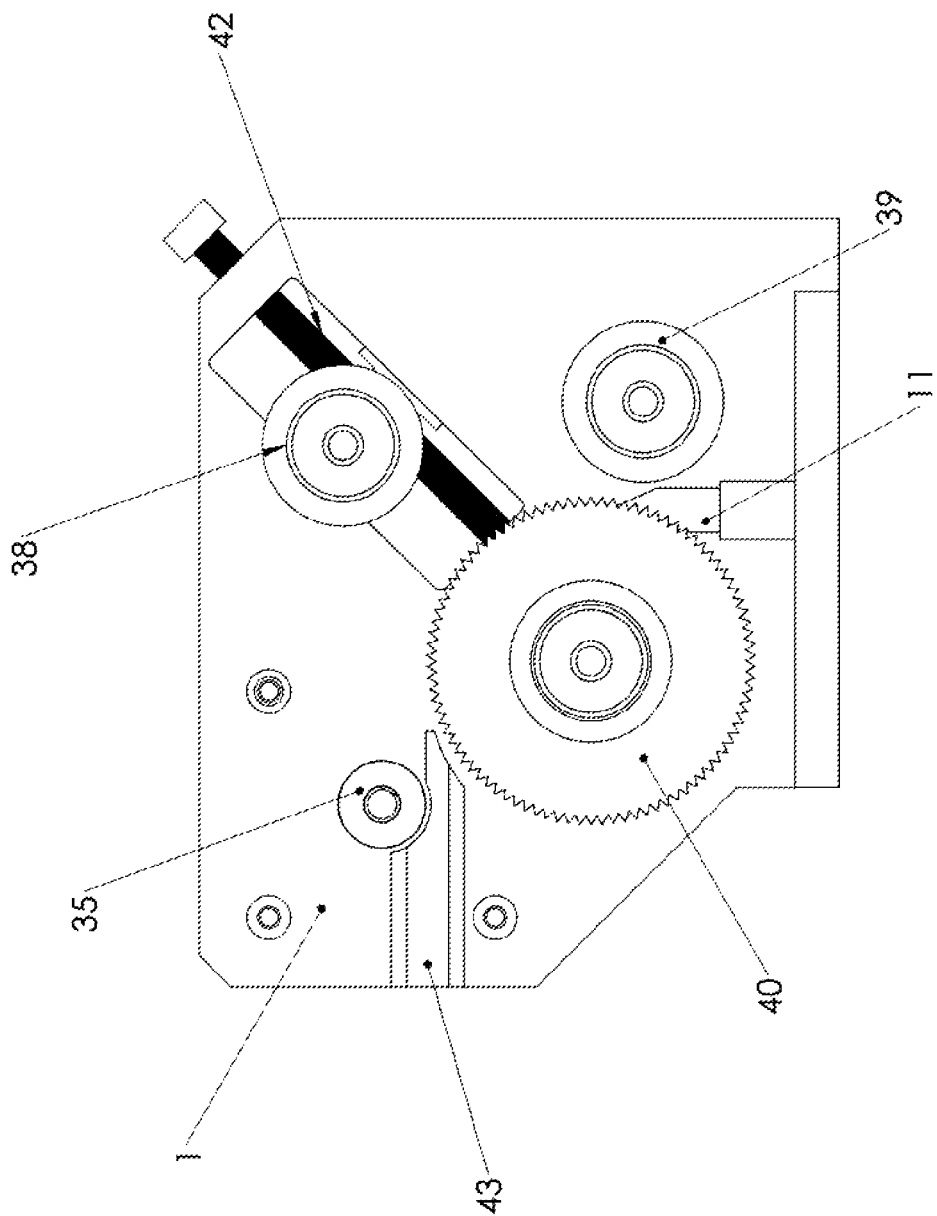
FIG. 2 is an illustration of an exemplary embodiment of a 3D printer extrusion head from a top view, depicting: a backplate, a knurl gear, a compression wheel, a filament guide, two separate pulley assemblies, and a tensioner assembly.

FIG. 2 depicts an exemplary embodiment of a 3D printer extrusion head, from a top view, and the components thereof.

In FIG. 2, the 3D printer extrusion head is comprised of: a backplate (1), a knurl gear (35), a compression wheel assembly (40), an input filament guide (11), an output filament guide (43), a tensioner assembly (42), a first pulley assembly (38) which sits above a tensioner assembly (42), and a second pulley assembly (39).

Figure 6:
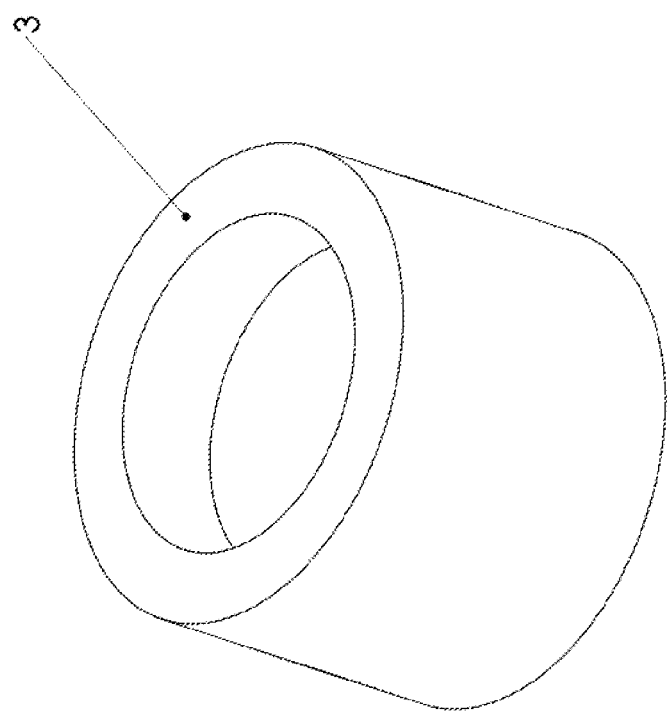
FIG. 6 is an illustration of an exemplary embodiment of a spring cap from a lateral view, rotated upwards approximately 75°.
Figure 12:
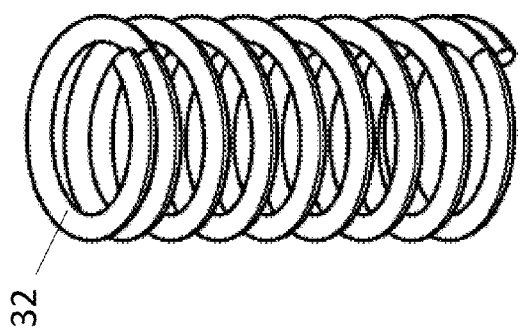
FIG. 12 is an illustration of a spring from a side view.

The tensioner assembly (42) of FIG. 2 is further comprised of the spring (32)—of FIG. 12—which is placed into a hole in the backplate (1), wherein a spring cap (3)—of FIG. 6—is placed at one end of the spring (32). The tensioner assembly (42) is further comprised of a tensioner assembly screw (24)—of FIG. 22—wherein the tensioner assembly screw (24) is threaded through the tensioner assembly (42) and is pressed against the spring cap (3); and a screw cap (4)—of FIG. 8—is placed at the end of tensioner assembly screw (24). The spring cap (3) sits on the top of the spring (32) to allow the tensioner assembly screw (24) to rest on the spring cap (3). The screw cap (4) attaches to the tensioner assembly screw (24) to allow a user to easily turn the tensioner assembly screw by hand.

FIG. 6 depicts an exemplary embodiment of a spring cap (3), wherein the spring cap (3) may have an inner diameter of 6 mm and an outer diameter of 8.5 mm.

Figure 8:
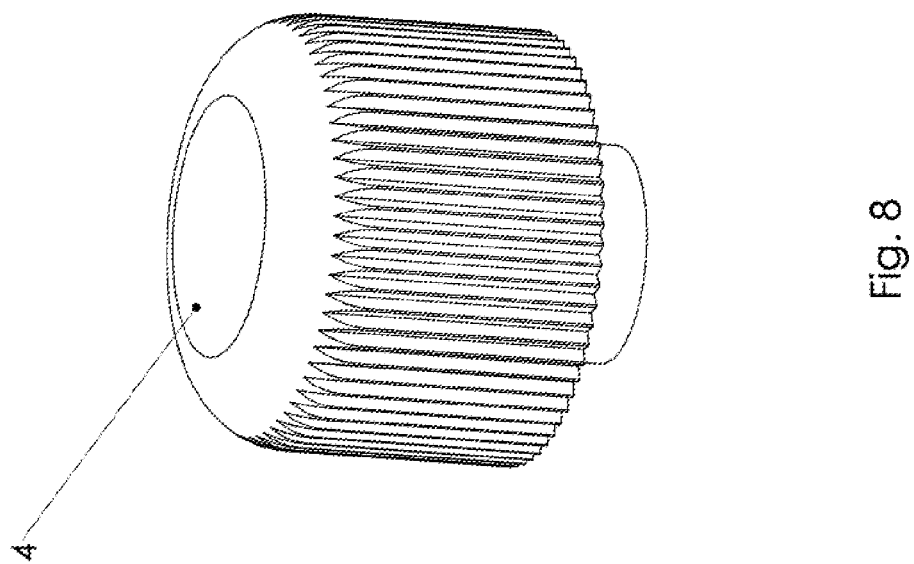
FIG. 8 is an illustration of a screw cap from a side view.

FIG. 8 depicts a screw cap (4), wherein the screw cap (4) may have an inner diameter of 5 mm, an outer diameter of 9.99 mm, a depth from the bottom of the cap to the head of the cap of 2.00 mm, and a depth from the head of the cap's bottom to the head of the cap's top of 7.50 mm.

FIG. 12 depicts a spring (32), wherein the spring may have a length, when curved, of 0.61 mm, an inner radius of 0.14 mm, and an inner radius of 0.11 mm.

FIG. 22 depicts a tensioner assembly screw (24), wherein the tensioner assembly screw (24) may have a depth, from the bottom of the screw to the screw head, of 2.25 mm and a screw head depth of 0.16 mm. Further, the tensioner assembly screw (24) may have an outer diameter, for the screw head, of 0.31 mm.

In another embodiment, a different tensioner assembly (42) may be used to allow for the tension to be more accurately or be automatically controlled for various filament types and sizes. In some embodiments, the 3D printer extrusion head disclosed herein may work for both very flexible filaments and semi-flexible filaments.

Figure 3:
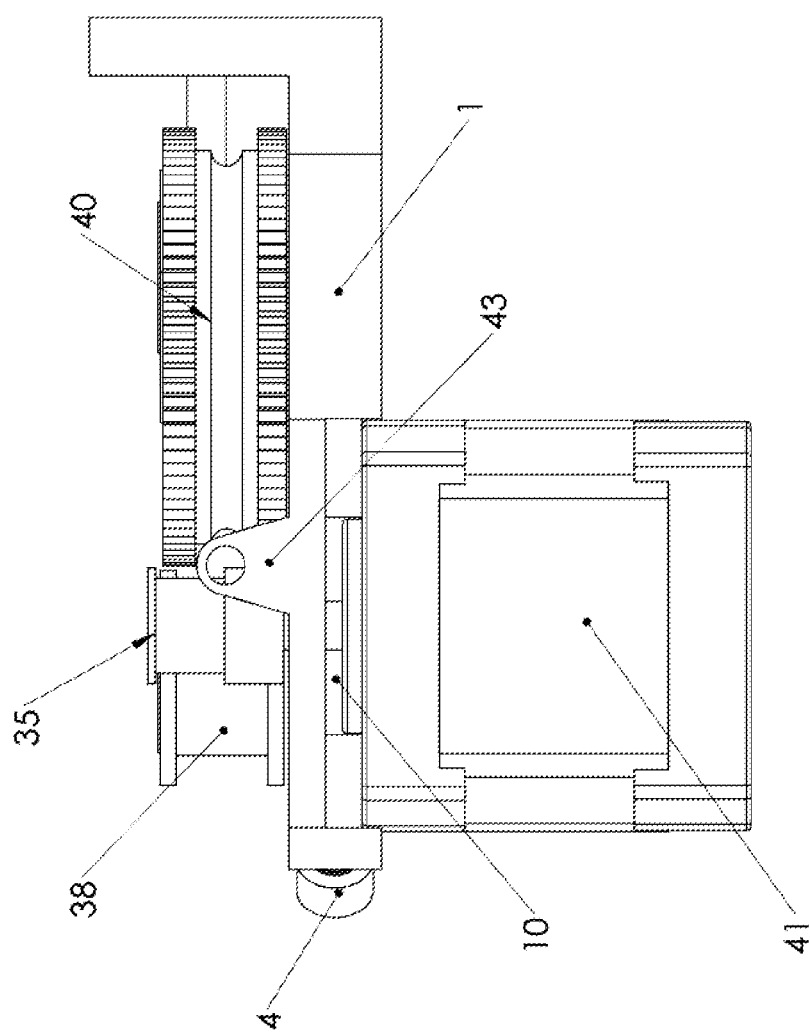
FIG. 3 is an illustration of an exemplary embodiment of a 3D printer extrusion head from a side view, depicting: a stepper motor assembly, an attachment spacer, a screw cap, a pulley assembly, a knurl gear, an output filament guide, a backplate, and a compression wheel.

FIG. 3 depicts an embodiment of a 3D printer extrusion head and the components, from a side view.

In FIG. 3, the 3D printer extrusion head is comprised of: a stepper motor assembly (41), an attachment spacer (10), a screw cap (4), a first pulley assembly (38), a knurl gear (35), a compression wheel (40), a backplate (1), and an output filament guide (43).

The output filament guide (43), of FIG. 3, is the guide wherein filament leaves the 3D printer extrusion head and is positioned onto a heated or unheated 3D printer bed.

Figure 10:
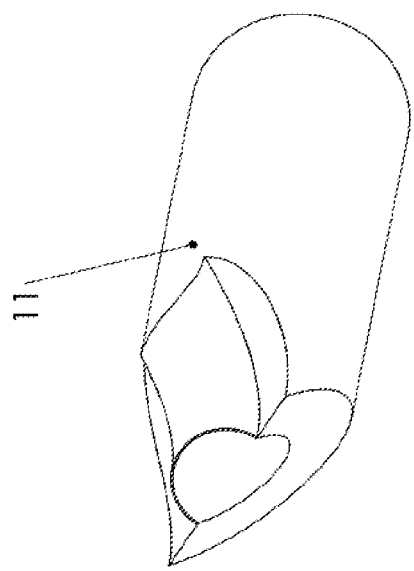
FIG. 10 is an illustration of an exemplary embodiment of a filament guide from a lateral view, rotated upwards approximately 20°.

FIG. 10 is an exemplary embodiment of an input filament guide (11), from a lateral view, rotated upwards approximately 20°.

Figure 11:
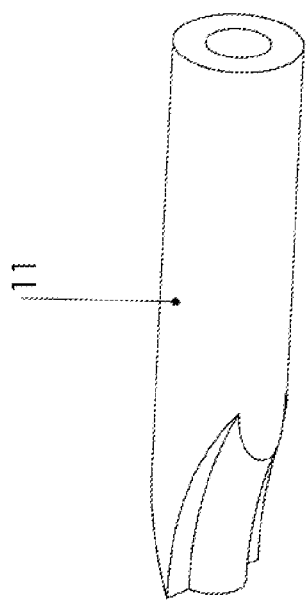
FIG. 11 is an illustration of an exemplary embodiment of a filament guide from a side view.

FIG. 11 is an exemplary embodiment of an input filament guide (11).

Figure 9:
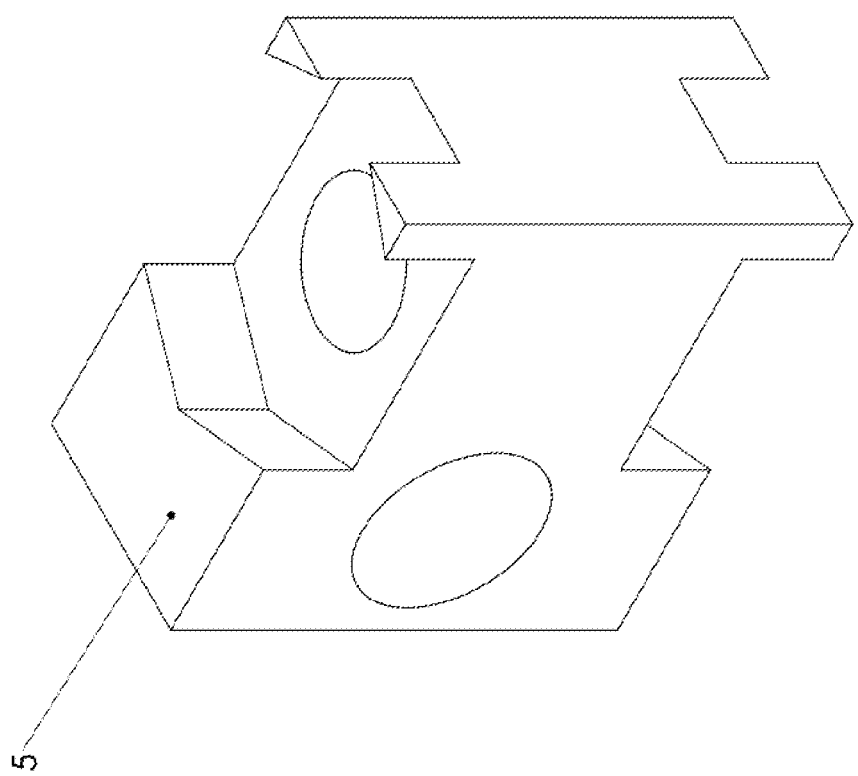
FIG. 9 is an illustration of an exemplary embodiment of an adjustment block from a lateral view, rotated upwards approximately 45°.

FIG. 9 depicts the 3D printer extrusion head's adjustment block (5).

In FIG. 9, the adjustment block (5) is comprised of a cube with multiple holes to mount a pulley assembly and for adjustments of belt tension. The adjustment block (5) may be attached to the first pulley assembly (38) by inserting the screw (25)—of FIG. 17—and nut (28)—of FIG. 13—to create the tensioner assembly (42) of FIG. 2. The adjustment block is further inserted with nuts (29 and 30) of FIG. 13. In some embodiments, the adjustment block (5) will compress a spring which will then cause the first pulley assembly (38) to move toward the center of the backplate (1) to decrease the tension of the pulley belt (37), or it will cause the first pulley assembly (38) to move away from the center of the backplate (1) to increase the tension of the pulley belt (37).

Figure 15:
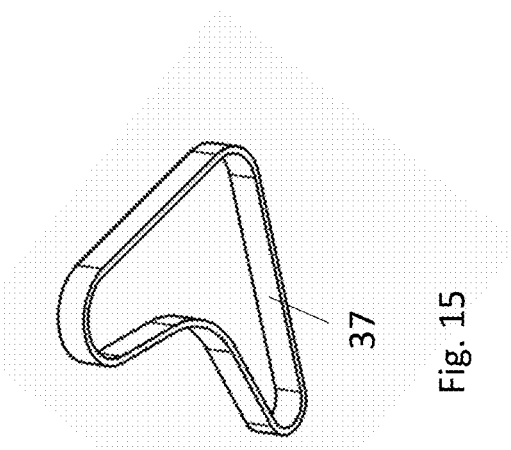
FIG. 15 is an illustration of an exemplary embodiment of a pulley belt from a bottom view, rotated upwards approximately 45°.

FIG. 15 depicts an exemplary embodiment of a pulley belt (37). In an exemplary embodiment of the 3D printer extrusion head of FIG. 1, the pulley belt (37) wraps around the compression wheel (40), the knurl gear (35), the first pulley assembly (38), and the second pulley assembly (39), wherein the pulley belt (37) is housed between the knurl gear (35) and the compression wheel (40) as it moves through the 3D printer extrusion head.

In FIG. 15, the pulley belt (37) which may, in the 3D printer extrusion head assembly, wrap around the compression wheel assembly (40), the first pulley assembly (38), and the second pulley assembly (39)—all of FIG. 1 and FIG. 2. The pulley belt (37) may a height of 0.27 mm and a depth of 0.06 mm.

The 3D printer extrusion head assembly of FIG. 1, FIG. 2, and FIG. 3 may be used for both rigid filaments (i.e. non-flexible filament) and less rigid filaments (i.e. flexible or medium-flexible filaments), but highly popular filaments like PLA. The 3D printer extrusion head of FIG. 1, FIG. 2, and FIG. 3 may also be used for filaments such as PETG, soft PLA, and other semi-flexible or flexible filaments. In another embodiment, a user may increase the radius of the compression wheel (2)—of FIG. 5—to make it a more gentle turn in the 3D printer extrusion head assembly to allow for extremely rigid filaments—such as polyether ether ketone (or PEEK).

In an exemplary embodiment, the filament is inserted into the device by releasing the tension on the pulley belt (37) by way of the tensioner assembly (42) and then inserting the filament into the input filament guide (11). Then, once the filament is in the groove of the compression wheel (2), the tension may be restored on the pulley belt (37) by way of the tensioner assembly (42). The filament can then be advanced into the hot-end—or output filament guide (43)—of the machine by using the knurled portion (or teeth) on the compression wheel (2) to manually advance the filament to the hot-end (43). In another embodiment, the user may also use the stepper motor assembly to automatically advance the filament to the hot-end (43), by turning the stepper motor assembly (41) on and allowing the pulley belt (37) to move the compression wheel (2) to advance the filament. After the filament has entered the hot-end (43), it will be ready to operate like a standard 3D printer extrusion head.

In another embodiment, a user can adjust tension in more than one way—either moving the screw attached in the tensioning assembly (42) further into the backplate (1) or further out of backplate (1). The tensioning platform may sit directly on the tensioning screw to allow it to move in the same direction as the tensioning screw, or it may sit above the screw so that as the tensioning screw moves further into the backplate, the tensioning platform moves further away from the center of the backplate. In other embodiments, a spring may be used in lieu of a tensioning screw.

In another embodiment, the tension on the filament may be increased by tightening the tensioning screw of the tensioner assembly (42). Alternatively, if the tension needs to be lessened, the tensioning screw of the tensioner assembly (42) may be loosened.

In another embodiment, the tensioner assembly (42) may be comprised of a spring and a rod which can be used to move the tensioning platform the first pulley assembly (38) sits on.

While preferred embodiments of the present invention have been shown and described herein, it will be obvious to those skilled in the art that such embodiments are provided by way of example only. Numerous variations, changes, and substitutions will now occur to those skilled in the art without departing from the invention. Specifically, the claimed invention and its components may have variations in sizes due to the resizing of the claimed invention to either shrink or expand it based on the filaments used and the 3D printer used. The claimed invention and its components should be understood to those skilled in the art that the sizes of components may be changed through ratio conversions. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A 3D printer extrusion head comprising:
   a backplate;
   a stepper motor assembly, wherein said stepper motor assembly further comprises a knurl gear;
   a compression wheel assembly, comprising a compression wheel further comprising a groove for a filament and teeth for traction of the filament and pulley belt;
   a system of pulleys, wherein a pulley belt wraps around said compression wheel, said system of pulleys, and said knurl gear; and
   an input filament guide and an output filament guide to guide said filament through the 3D printer extrusion head.

2. The 3D printer extrusion head of claim 1, further comprising an attachment spacer.

3. The 3D printer extrusion head of claim 1, wherein each of said system pulleys is further comprised of two or more pulleys, and each of said two or more pulleys is comprised of two pulley spacers and two bearings, and wherein a screw and a nut are used to attach said pulley assembly to said backplate.

4. The 3D printer extrusion head of claim 1, wherein said backplate is comprised of one or more screw holes and one or more bearing holes to affix said backplate to a 3D printer.

5. The 3D printer extrusion head of claim 1, wherein said stepper motor assembly is comprised of one or more stepper motors.

6. The 3D printer extrusion head of claim 1, wherein said input filament guide and said output filament guide further comprises the ability to control a filament.

7. The 3D printer extrusion head of claim 1, wherein said filament comprises a flexible filament.

8. The 3D printer extrusion head of claim 1, wherein said filament comprises a medium-flexible filament.

9. The 3D printer extrusion head of claim 1, wherein said filament comprises a non-flexible filament.

10. The 3D printer extrusion head of claim 1, wherein said backplate, said compression wheel, said pulley spacer, said attachment spacer, and said input filament guide are 3D printed.

11. The 3D printer extrusion head of claim 1, wherein said compression wheel assembly further comprises two bearings, a screw and a nut to attach said compression wheel assembly to said backplate.

12. The 3D printer extrusion head of claim 1, wherein said stepper motor assembly is attached to said backplate using four screws.

13. The 3D printer extrusion head of claim 1, wherein one of said system of pulleys is fixed to a tensioning platform which may move closer or further from the center of said backplate to create less or more tension on said pulley belt.

14. The 3D printer extrusion head of claim 13, wherein said tensioning platform is further comprised of a spring, a moveable trolley, a spring cap, a screw, wherein said spring cap is placed at the top end of said spring to allow said spring to move said moveable trolley which will then move said tensioning platform.

* * * * *